(12) United States Patent
Li et al.

(10) Patent No.: US 9,323,625 B2
(45) Date of Patent: Apr. 26, 2016

(54) SYSTEMS AND METHODS FOR LOST SYNCHRONIZATION DATA SET REPROCESSING

(71) Applicant: LSI Corporation, San Jose, CA (US)

(72) Inventors: Shu Li, San Jose, CA (US); Fan Zhang, Milpitas, CA (US); Jun Xiao, Fremont, CA (US); Jefferson Singleton, Westminster, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 263 days.

(21) Appl. No.: 14/080,935

(22) Filed: Nov. 15, 2013

(65) Prior Publication Data

US 2015/0134613 A1    May 14, 2015

Related U.S. Application Data

(60) Provisional application No. 61/902,934, filed on Nov. 12, 2013.

(51) Int. Cl.
| | |
|---|---|
| *H04L 7/04* | (2006.01) |
| *G06F 11/14* | (2006.01) |
| *G11B 5/09* | (2006.01) |
| *G11B 20/12* | (2006.01) |
| *G06F 17/30* | (2006.01) |

(52) U.S. Cl.
CPC ...... *G06F 11/1469* (2013.01); *G06F 17/30424* (2013.01); *G06F 17/30581* (2013.01); *G11B 5/09* (2013.01); *G11B 20/1217* (2013.01); *G11B 2020/1287* (2013.01)

(58) Field of Classification Search
CPC ........................................................ H04L 7/048
USPC .......................... 714/798, 799, 755, 730, 718
See application file for complete search history.

(56) References Cited

U.S. PATENT DOCUMENTS

| | | | |
|---|---|---|---|
| 5,701,314 | A | 12/1997 | Armstrong |
| 5,712,861 | A | 1/1998 | Inoue |

(Continued)

FOREIGN PATENT DOCUMENTS

| | | |
|---|---|---|
| EP | 2242054 A2 | 10/2010 |
| WO | WO 2008/087042 A1 | 7/2008 |
| WO | WO 2011/091845 A1 | 8/2011 |

OTHER PUBLICATIONS

Chase, D, "A Class of Algorithms for Decoding Block Codes with Channel Measurement Information" IEEE Transactions on Info theory, vol. 18, No. 1 Jan. 1, 1972.

(Continued)

*Primary Examiner* — Fritz Alphonse (57) ABSTRACT

Systems and method relating generally to data processing, and more particularly to systems and methods for segmenting a data set and recovering the segmented data set. In one particular example, a method is disclosed that includes: querying an input data set for an actual sync mark; forcing a proxy sync mark where the actual sync mark is not found in the input data set; applying data processing to the input data set to yield a processed output; correlating a potion of the processed output with a corresponding portion of the input data set to yield a true sync location; calculating a difference between the true sync location and the location of the forced sync mark to yield an offset; re-forcing the proxy sync mark based upon the offset; and re-applying the data processing to the input data set aligned using the re-forced proxy sync mark to yield a re-processed output.

22 Claims, 8 Drawing Sheets

(56) References Cited

U.S. PATENT DOCUMENTS

| | | | |
|---|---|---|---|
| 5,797,020 A | | 8/1998 | Bonella et al. |
| 5,966,415 A | * | 10/1999 | Bliss ................ G11B 20/10009 375/341 |
| 6,009,549 A | * | 12/1999 | Bliss ................ G11B 20/10009 360/51 |
| 6,157,510 A | | 12/2000 | Schreck et al. |
| 6,185,620 B1 | | 2/2001 | Weber et al. |
| 6,405,342 B1 | | 6/2002 | Lee |
| 6,438,717 B1 | | 8/2002 | Butler |
| 6,507,546 B1 | * | 1/2003 | Bliss ....................... G11B 20/10 360/65 |
| 6,516,443 B1 | * | 2/2003 | Zook ................ G11B 20/10009 714/792 |
| 6,657,803 B1 | | 12/2003 | Ling |
| 7,076,719 B2 | | 7/2006 | Anjo et al. |
| 7,136,244 B1 | | 11/2006 | Rothberg |
| 7,154,690 B1 | | 12/2006 | Brunnett et al. |
| 7,685,467 B2 | | 3/2010 | Mandal et al. |
| 7,702,989 B2 | | 4/2010 | Graef |
| 7,730,384 B2 | | 6/2010 | Graef |
| 7,738,201 B2 | | 6/2010 | Jin |
| 7,760,455 B2 | | 7/2010 | Kang et al. |
| 7,971,125 B2 | | 6/2011 | Graef |
| 7,990,642 B2 | | 8/2011 | Lee |
| 8,041,998 B2 | | 10/2011 | Mandal et al. |
| 8,176,404 B2 | | 5/2012 | Yang |
| 8,443,251 B1 | | 5/2013 | Zhang et al. |
| 2009/0046385 A1 | | 2/2009 | Yamamoto |
| 2009/0310249 A1 | | 12/2009 | Michinaga |
| 2011/0080211 A1 | | 4/2011 | Yang |
| 2011/0161633 A1 | | 6/2011 | Xu |
| 2011/0264980 A1 | | 10/2011 | Li |
| 2012/0198129 A1 | | 8/2012 | Van Aken et al. |
| 2012/0200954 A1 | | 8/2012 | Jin |
| 2012/0236429 A1 | | 9/2012 | Yang |

OTHER PUBLICATIONS

Dong-U Lee et al "Pilotless Frame Synchronization via LDPC Code Constraint Feedback" IEEE Comm. Letters, NJ, US vol. 11 No. 8, Aug. 1, 2007.

Olmos et al., "Tree-Structure Expectation Propagation for LDPC Decoding in Erasure Channels", Cornell University Library arXiv:1009.4287 (Sep. 22, 2010).

U.S. Appl. No. 13/644,589, filed Oct. 4, 2012, Shaohua Yang, Unpublished.

U.S. Appl. No. 13/465,214, filed May 7, 2012, Chung-Li Wang, Unpublished.

U.S. Appl. No. 13/483,982, filed May 30, 2012, Yang Han, Unpublished.

U.S. Appl. No. 13/445,858, filed Apr. 12, 2012, Johnson Yen, Unpublished.

U.S. Appl. No. 13/490,849, filed Jun. 7, 2012, Johnson Yen, Unpublished.

U.S. Appl. No. 13/560,737, filed Jul. 27, 2012, Weijun Tan, Unpublished.

U.S. Appl. No. 13/602,440, filed Sep. 4, 2012, Fan Zhang, Unpublished.

U.S. Appl. No. 13/644,542, filed Oct. 4, 2012, Shaohua Yang, Unpublished.

U.S. Appl. No. 13/692,908, filed Dec. 3, 2012, Fan Zhang, Unpublished.

U.S. Appl. No. 13/474,672, filed May 17, 2012, Fan Zhang, Unpublished.

U.S. Appl. No. 13/459,282, filed Apr. 30, 2012, Fan Zhang, Unpublished.

U.S. Appl. No. 13/412,492, filed Mar. 5, 2012, Shaohua Yang, Unpublished.

U.S. Appl. No. 13/326,367, filed Dec. 15, 2011, Shaohua Yang, Unpublished.

U.S. Appl. No. 13/372,600, filed Feb. 14, 2012, Shaohua Yang, Unpublished.

U.S. Appl. No. 13/869,862, filed Apr. 24, 2013, Fan Zhang, Unpublished.

U.S. Appl. No. 13/802,627, filed Mar. 13, 2013, Shaohua Yang, Unpublished.

U.S. Appl. No. 13/770,030, filed Feb. 19, 2013, Chung-Li Wang, Unpublished.

U.S. Appl. No. 13/326,363, filed Dec. 15, 2011, Fan Zhang, Unpublished.

* cited by examiner

SYSTEMS AND METHODS FOR LOST SYNCHRONIZATION DATA SET REPROCESSING

CROSS REFERENCE TO RELATED APPLICATIONS

The present application claims priority to (is a non-provisional of) U.S. Pat. App. No. 61/902,934, entitled "Systems and Methods for Lost Synchronization Data Set Reprocessing", and filed Nov. 12, 2013, by Li et al. The entirety of the aforementioned provisional patent application is incorporated herein by reference for all purposes.

FIELD OF THE INVENTION

Systems and method relating generally to data processing, and more particularly to systems and methods for segmenting a data set and recovering the segmented data set.

BACKGROUND

Data devices often augment data to be transferred with various formatting data that allows for recovery of the transferred data. For example, a data set may be transferred with a synchronization mark that is utilized to indicate the beginning of a data set to be processed. In some cases, however, the synchronization mark is corrupted by noise or other factors. In such cases, the data set may not be recoverable. This loss of data becomes more significant as more and more user data is associated with a limited number of synchronization marks.

Hence, for at least the aforementioned reasons, there exists a need in the art for advanced systems and methods for data processing.

SUMMARY

Systems and method relating generally to data processing, and more particularly to systems and methods for segmenting a data set and recovering the segmented data set.

Various embodiments of the present invention provide data processing systems that include: the sync mark detection and forcing circuit, the data processing circuit, and a reverse sync mark derivation circuit. The sync mark detection and forcing circuit is operable to: receive an input data set; query the input data set to identify an actual sync mark; force a proxy sync mark where the actual sync mark is not identified; and re-force the proxy sync mark based upon an offset. The data processing circuit is operable to: apply a data processing algorithm to the input data set aligned using the forced proxy sync mark to yield a processed output; and re-apply the data processing algorithm to the input data set aligned using the re-forced proxy sync mark to yield a re-processed output. The reverse sync mark derivation circuit is operable to: correlate a portion of the processed output with a corresponding portion of the input data set to yield a true sync location; and a calculate a difference between the true sync location and the location of the forced sync mark to yield the offset.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS

Systems and method relating generally to data processing, and more particularly to systems and methods for segmenting a data set and recovering the segmented data set.

Various embodiments of the present invention provide data transfer systems that include: a data transfer preparation circuit, a transfer characteristic determination circuit, and a format insertion circuit. The data transfer preparation circuit is operable to receive a user data set and to generate an output data set based upon the user data set. The transfer characteristic determination circuit is operable to determine a characteristic of an expected transfer of the output data set. The format insertion circuit is operable to dynamically augment the output data set with formatting information at a location selected based at least in part on the characteristic of the expected transfer to yield a transfer data set. In some cases, the data transfer system is implemented as part of an integrated circuit.

In some instances of the aforementioned embodiments, the data transfer preparation circuit includes a data encoder circuit that is operable to apply a data encoding algorithm to an encoder input derived from the user data set to yield an encoded data set. In some cases, the data encoding algorithm is a low density parity check encoding algorithm. In one or more cases, the data transfer preparation circuit further includes a scrambler circuit that is operable to segregate the encoded data set into segments, and to re-arrange the segments.

In various instances of the aforementioned embodiments of the present invention, the characteristic of the expected transfer of the output data set is a maximum length between formatting information in the transfer data set. In some such instances, the data transfer system is implemented as part of a storage device, or a communication device. In one or more instances of the aforementioned embodiments, the data transfer system is implemented as part of a hard disk drive including a disk platter. In some such instances, the characteristic of an expected transfer of the output data set is a first characteristic that is a location of a servo data wedge on the disk platter relative to the output data set. The transfer characteristic determination circuit is further operable to determine a second characteristic of the expected transfer of the output data set that is a maximum length between formatting information in the transfer data set. In some cases, the format insertion circuit is operable to dynamically augment the output data set with formatting information at a location selected based at least in part on the first characteristic and the second characteristic of the expected transfer to yield a transfer data set. In some cases, the formatting information includes a sync mark. This sync mark is a known pattern.

Other embodiments of the present invention provide methods for data transfer that include: receiving a user data set; preparing the user data set for transfer using a data transfer preparation circuit to yield an output data set; determining a characteristic of the an expected transfer of the output data set; and dynamically augmenting the output data set with formatting information at a location selected based at least in part on the characteristic of the expected transfer to yield a transfer data set.

In some instances of the aforementioned embodiments, the data transfer preparation circuit includes a data encoder, and preparing the user data set for transfer includes applying a data encoding algorithm to an encoder input derived from the user data set to yield an encoded data set. In some cases, the data transfer preparation circuit further includes a scrambler circuit, and preparing the user data set for transfer further includes segregating the encoded data set into segments, and re-arranging the segments. In some cases, the characteristic of the expected transfer of the output data set is a maximum length between formatting information in the transfer data set. In various cases, the transfer data set is destined for a disk platter, and the characteristic of the expected transfer of the output data set is a location of a servo data wedge on the disk platter relative to the output data set.

Yet other embodiments of the present invention provide hard disk storage devices that include a disk platter and a data write circuit. The disk platter has at least a first servo data wedge and a second servo data wedge. The data write circuit includes: a data transfer preparation circuit operable to receive a user data set and to generate an output data set based upon the user data set; a transfer characteristic determination circuit operable to determine a location of the first servo data wedge relative to an expected storage location of the output data set, and a distance between the first servo data wedge and the second servo data wedge; and a format insertion circuit operable to dynamically augment the output data set with formatting information at a location selected based at least in part on one of the distance between the first servo data wedge and the second servo data wedge and the location of the first servo data wedge relative to an expected storage location of the output data set.

Various embodiments of the present invention provide data processing systems that include: the sync mark detection and forcing circuit, the data processing circuit, and a reverse sync mark derivation circuit. The sync mark detection and forcing circuit is operable to: receive an input data set; query the input data set to identify an actual sync mark; force a proxy sync mark where the actual sync mark is not identified; and re-force the proxy sync mark based upon an offset. The data processing circuit is operable to: apply a data processing algorithm to the input data set aligned using the forced proxy sync mark to yield a processed output; and re-apply the data processing algorithm to the input data set aligned using the re-forced proxy sync mark to yield a re-processed output. The reverse sync mark derivation circuit is operable to: correlate a portion of the processed output with a corresponding portion of the input data set to yield a true sync location; and a calculate a difference between the true sync location and the location of the forced sync mark to yield the offset. In some cases, the data processing systems are implemented as part of a storage device. In other cases, the data processing systems are implemented as part of a communication device. The actual sync mark may a known pattern. In some cases, the data processing system is implemented as part of an integrated circuit.

In some instances of the aforementioned embodiments, the reverse sync mark derivation circuit is further operable to auto-correlate the corresponding portion of the input data set to yield an original sync location. In some such instances, calculating the difference between the true sync location and the location of the forced sync mark includes calculating a difference between the true sync location and the original sync location. In various instances of the aforementioned embodiments, the data processing circuit includes a data decoding circuit operable to apply a data decoding algorithm to a decoder input derived from the input data set to yield the processed output. In some cases, the data decoding algorithm is a low density parity check algorithm. In some cases, the data processing circuit further includes a data detecting circuit operable to apply a data detection algorithm to a detector input derived from the input data to yield a detected output. In such cases, the decoder input is derived from the detected output. In various cases, the data processing circuit further includes a de-scrambling circuit operable to de-scramble the detected output to yield the decoder input.

In other instances of the aforementioned embodiments, querying the input data set to identify an actual sync mark includes comparing the input data set with a known sync pattern. In some instances of the aforementioned embodiments, the sync mark detection and forcing circuit is operable to re-force the proxy sync mark based upon the offset when the processed output includes errors. In one or more instances of the aforementioned embodiments, the sync mark detection and forcing circuit is operable to query the input data set to identify the actual sync mark during a period when formatting information including the actual sync mark is expected.

Other embodiments of the present invention provide methods for data transfer that include: receiving an input data set; querying the input data set for an actual sync mark; forcing a proxy sync mark where the actual sync mark is not found in the input data set; applying a data processing algorithm using a data processing circuit to the input data set to yield a processed output; correlating a portion of the processed output with a corresponding portion of the input data set to yield a true sync location; calculating a difference between the true sync location and the location of the forced sync mark to yield an offset; re-forcing the proxy sync mark based upon the offset; and re-applying the data processing algorithm using the data processing circuit to the input data set aligned using the re-forced proxy sync mark to yield a re-processed output.

In various instances of the aforementioned embodiments, the method further includes auto-correlating the corresponding portion of the input data set to yield an original sync location. Calculating the difference between the true sync location and the location of the forced sync mark includes calculating a difference between the true sync location and the original sync location. In some instances of the aforementioned embodiments, the data processing circuit includes a data decoding circuit operable to apply a data decoding algorithm to a decoder input derived from the input data set to yield the processed output. In some cases, the data decoding algorithm is a low density parity check algorithm. In various cases, the data processing circuit further includes a data detecting circuit operable to apply a data detection algorithm to a detector input derived from the input data to yield a detected output. In some cases, the decoder input is derived from the detected output.

Yet other embodiments of the present invention provide hard disk storage including: a disk platter storing information; a read/write head disposed in relation to the disk platter, and operable to sense the information to yield a sensed output; an analog to digital converter circuit operable to convert an analog input corresponding to the sensed output into digital samples; an equalizer circuit operable to equalize the digital samples to yield an equalized output; a sync mark detection and forcing circuit; a data processing circuit; and a reverse sync mark derivation circuit. The sync mark detection and forcing circuit is operable to: receive the equalized output; query the equalized output to identify an actual sync mark; force a proxy sync mark where the actual sync mark is not identified; and re-force the proxy sync mark based upon an offset. The data processing circuit is operable to: apply a data processing algorithm to the equalized output aligned using the forced proxy sync mark to yield a processed output; and re-apply the data processing algorithm to the equalized output aligned using the re-forced proxy sync mark to yield a re-processed output. The reverse sync mark derivation circuit is operable to: correlate a portion of the processed output with a corresponding portion of the equalized output to yield a true sync location; and a calculate a difference between the true sync location and the location of the forced sync mark to yield the offset.

Figure 1:
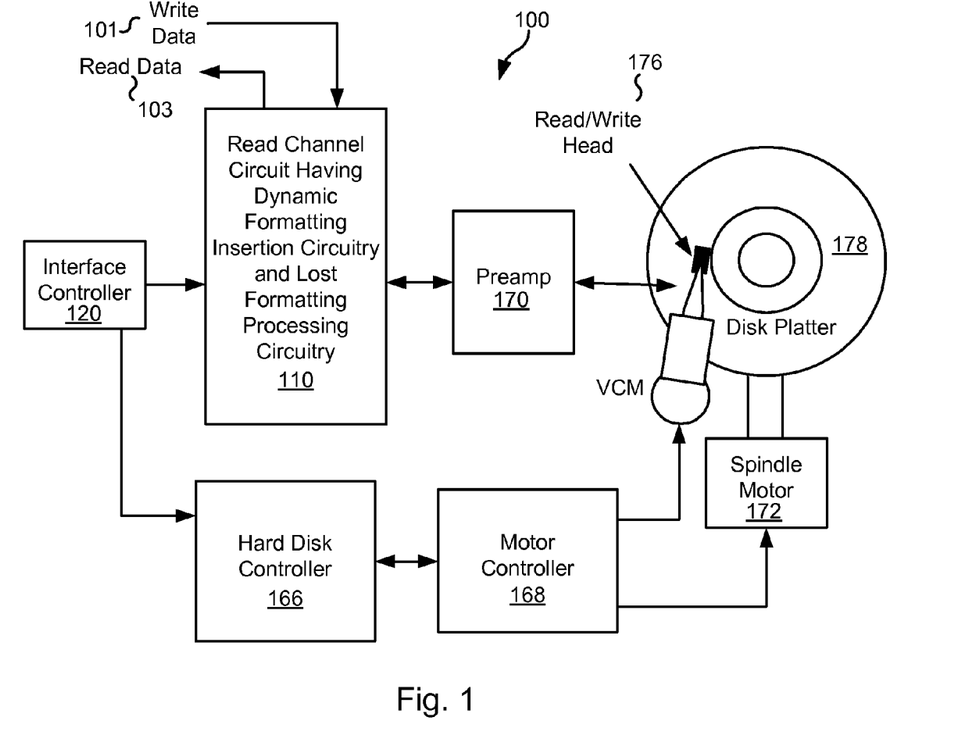
FIG. 1 shows a storage device including a read channel circuit having dynamic formatting insertion circuitry and lost formatting processing circuitry in accordance with various embodiments of the present invention.

Turning to FIG. 1, a storage system 100 is shown that includes a read channel 110 having dynamic formatting insertion circuitry and lost formatting processing circuitry in accordance with one or more embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178, and interacts with a host controller (not shown). The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head 176 is accurately positioned by motor controller 168 over a desired data track on disk platter 178. Motor controller 168 both positions read/write head 176 in relation to disk platter 178 and drives spindle motor 172 by moving read/write head assembly 176 to the proper data track on disk platter 178 under the direction of hard disk controller 166. Spindle motor 172 spins disk platter 178 at a determined spin rate (RPMs). Once read/write head 176 is positioned adjacent the proper data track, magnetic signals representing data on disk platter 178 are sensed by read/write head 176 as disk platter 178 is rotated by spindle motor 172. The sensed magnetic signals are provided as a continuous, minute analog signal representative of the magnetic data on disk platter 178. This minute analog signal is transferred from read/write head 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

In operation, data written to disk platter 178 is split into slices or portions. The formatting insertion circuitry of read channel circuit 110 occasionally interrupts the flow of slices destined to be written to disk platter 178 by dynamically inserting formatting information based upon the location of servo data wedges on disk platter 178 and the distance between servo data wedges on disk platter 178. This formatting information includes a sync mark that may be used for alignment with written data. In some cases, the dynamic insertion of formatting information is designed to assure that long runs of the slices destined for user data regions between servo data wedges are broken into portions small enough to be corrected using erasure decoding. The formatting information interrupting the flow of the slices is used when the data is read back from disk platter 178 to orient the data processing to the received data and assure proper alignment. Where one or more elements of the formatting information is not recoverable, the lost formatting processing circuitry of read channel circuit 110 is operable to force formatting information at an expected location. Where the forced formatting information fails to provide the needed alignment, the lost formatting processing circuitry of read channel circuit 110 uses decoded information to more accurately identify a location for the forced formatting information, and the processing is repeated using the more accurate location information. The dynamic formatting information insertion and lost formatting processing may be done using a circuit similar to that discussed below in relation to FIG. 3, and/or the processing may be performed similar to the methods described below in relation to FIGS. 6-8.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platted 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 2:
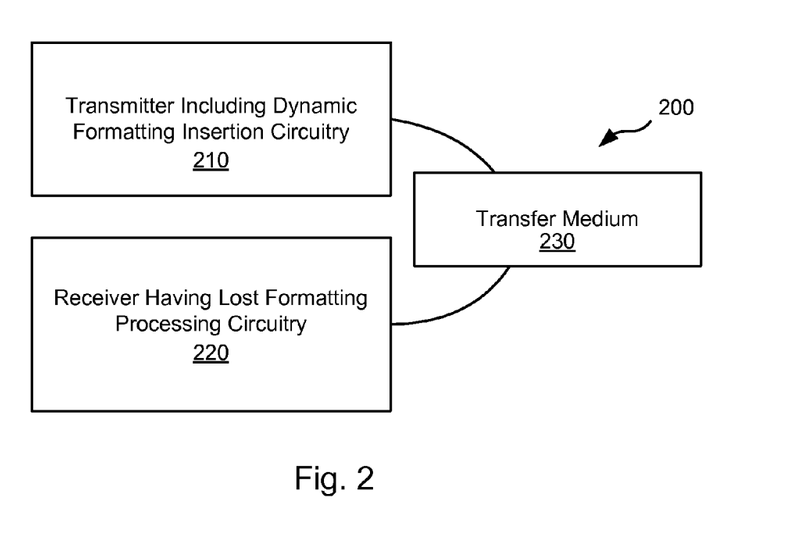
FIG. 2 shows a data transmission device including a transmitter having dynamic formatting insertion circuitry and a receiver having lost formatting processing circuitry in accordance with one or more embodiments of the present invention.

Turning to FIG. 2, a data transmission system 200 including a transmitter 210 including dynamic formatting insertion circuitry and a receiver 220 including lost formatting processing circuitry in accordance with one or more embodiments of the present invention. Transmitter 210 is operable to process data from transmission to receiver 220, with the transmitted data passing through a transmission medium 230.

During operation, data sent via transfer medium 230 includes formatting information that is dynamically inserted into a stream of data. The dynamic formatting information insertion processing may be done using a circuit similar to that discussed below in relation to the write side of FIG. 3, and/or the processing may be performed similar to the method described below in relation to FIG. 6. The formatting information inserted into the transmitted data is used when the data is received via transfer medium 230 to orient the data processing to the received data and assure proper alignment. Where one or more elements of the formatting information is not recoverable, the lost formatting processing circuitry of receiver 220 is operable to force formatting information at an expected location. Where the forced formatting information fails to provide the needed alignment, the lost formatting processing circuitry of receiver 220 uses decoded information to more accurately identify a location for the forced formatting information, and the processing is repeated using the more accurate location information. The lost formatting processing may be done using a circuit similar to that discussed below in relation to the read side of FIG. 3, and/or the processing may be performed similar to the methods described below in relation to FIGS. 7-8.

Figure 3:
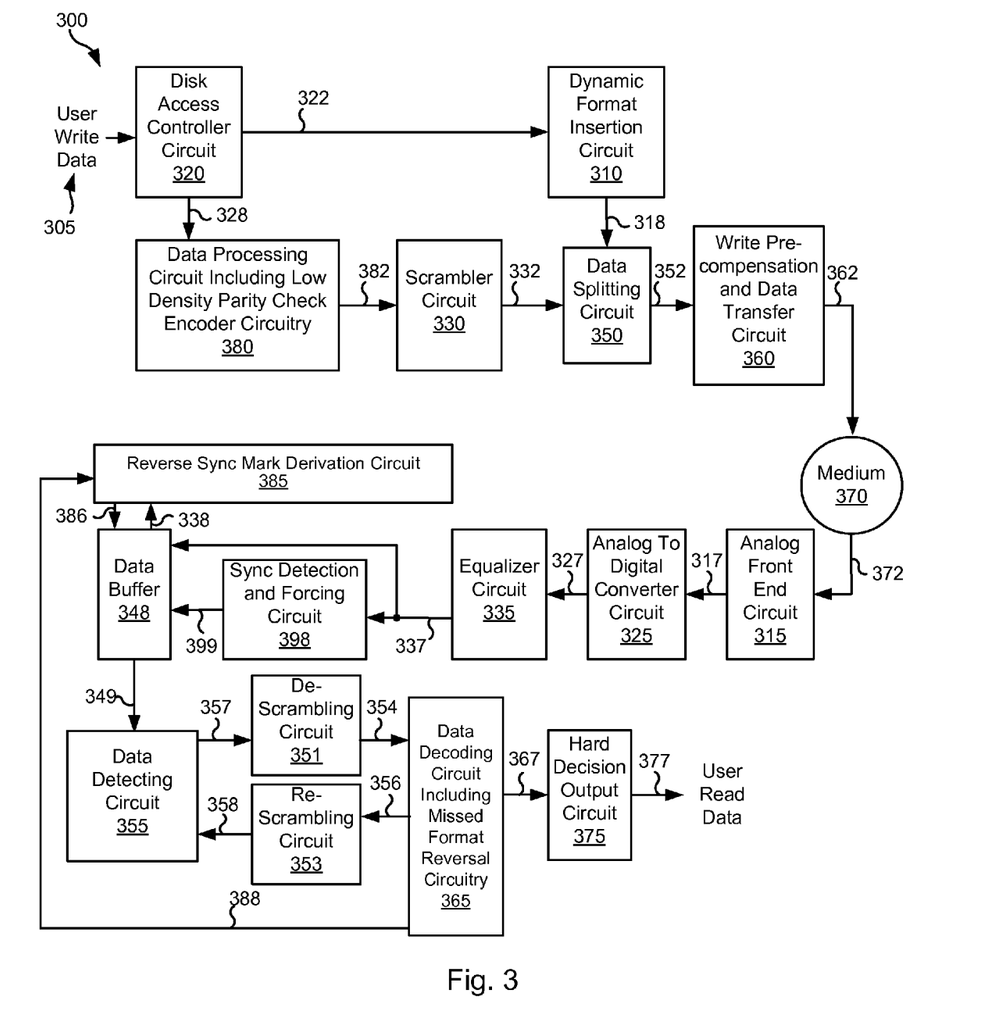
FIG. 3 shows a data processing circuit including dynamic formatting insertion circuitry and lost formatting processing circuitry in accordance with some embodiments of the present invention.

Turning to FIG. 3, a data transfer circuit 300 is shown that includes dynamic formatting insertion circuitry and lost formatting processing circuitry in accordance with some embodiments of the present invention. Data transfer circuit 300 includes a disk access controller circuit 320 that is operable to receive user write data 305 that is to be stored to a medium 370. It should be noted that while data transfer circuit 300 is specifically spoken of as transferring data to and from medium 370 that is a storage medium, in other embodiments of the present invention data transfer circuit 300 may be separated into a transmitter and a receiver side with the transmitter operable to transmit data to the receiver side via medium 370. In addition to receiving user write data 305, disk access controller circuit 320 is operable to identify the location of servo data wedges on medium 370 and the number of elements of data (distance) written between servo data wedges without intervening formatting information. This location information and distance information is provided as a format location output 322 from disk access controller circuit 320 to a dynamic format insertion circuit 310.

Figure 4A:
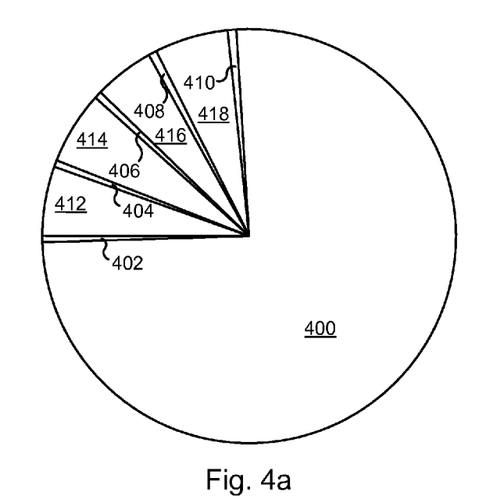
FIG. 4a, graphically depicts a storage medium showing a number of servo data wedges distributed radially around the storage medium.
Figure 4B:
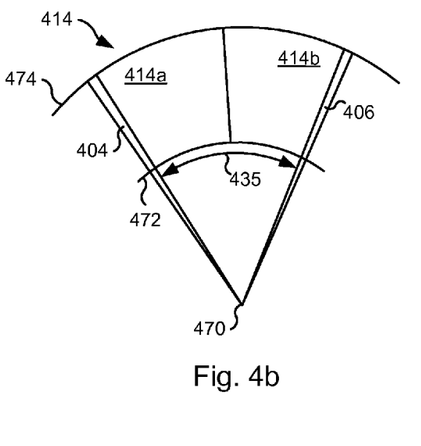
FIG. 4b, shows a portion of the storage medium of FIG. 4a, between two servo data wedges and a maximum erasure user data distance between an inner diameter and an outer diameter in accordance with various embodiments of the present invention.

Turning to FIG. 4a, an example of medium 370 is shown as a disk platter 400. As shown, disk platter 400 includes a number of radially arranged servo data wedges 402, 404, 406, 408, 410. User data regions 412, 414, 416, 418 are located between the servo data wedges. In particular, user data region 412 is located between servo data wedge 402 and servo data wedge 404; user data region 414 is located between servo data wedge 404 and servo data wedge 406; user data region 416 is located between servo data wedge 406 and servo data wedge 408; and user data region 418 is located between servo data wedge 408 and servo data wedge 410. FIG. 4b is a more detailed view of the region of disk platter 400 between servo data wedge 404 and servo data wedge 406. A maximum length 435 (corresponding to a maximum number of elements) that can be corrected using erasure decoding. Said another way, maximum length 435 corresponds to the maximum number of elements of encoded data that can be erased and recreated using a data decoding circuit. Maximum length 435 will vary depending upon the type of encoding and decoding employed by data transfer circuit 300.

As shown, the length of user data region 414 between servo data wedge 404 and servo data wedge 406 corresponds to maximum length 435 at a location 472 between an inner diameter 470 and an outer diameter 474 of disk platter 400. Data transfer circuit 300 is operable to dynamically insert formatting information into the data stored to disk platter 400 such that the maximum number of elements of the data from a previously stored formatting information does not exceed maximum length 435. Thus, as the length between servo data wedge 404 and servo data wedge 406 increases beyond maximum length 435 the closer the write location gets to outer diameter 474, splitting the user data region with intervening formatting information becomes helpful. Because of this, data transfer circuit 300 dynamically inserts formatting information into a data set that is to cover the length between servo data wedge 404 and servo data wedge 406 at some point to assure that the maximum length of data from inserted formatting information does not exceed maximum length 435. This need to split data near outer diameter 474 of disk platter 400 is represented by splitting user data region 414 into two sections 414a, 414b. FIG. 4b, shows one section in detail, but it should be noted that the other sections may be similarly represented.

Referring again to FIG. 3, in addition, user write data 305 is provided as a write data set 328 to a data processing circuit 380. Data processing circuit 380 includes low density parity check encoder circuitry. Data processing circuit 380 applies one or more processes to write data set 328 including low density parity check encoding to yield an encoded output 382. Based upon the disclosure provided herein, one of ordinary skill in the art will recognize a variety of processes that may be applied in addition to the low density parity check encoding in accordance with different embodiments of the invention including, but not limited to, run length limited encoding, interleaving, and/or modulation code encoding.

Figure 5A:
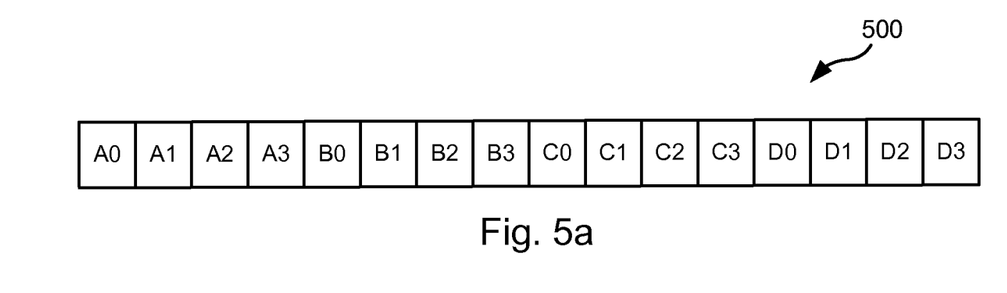
FIGS. 5a-5b, graphically depict a data scrambling process that may be applied to a data set to be transferred.
Figure 5B:
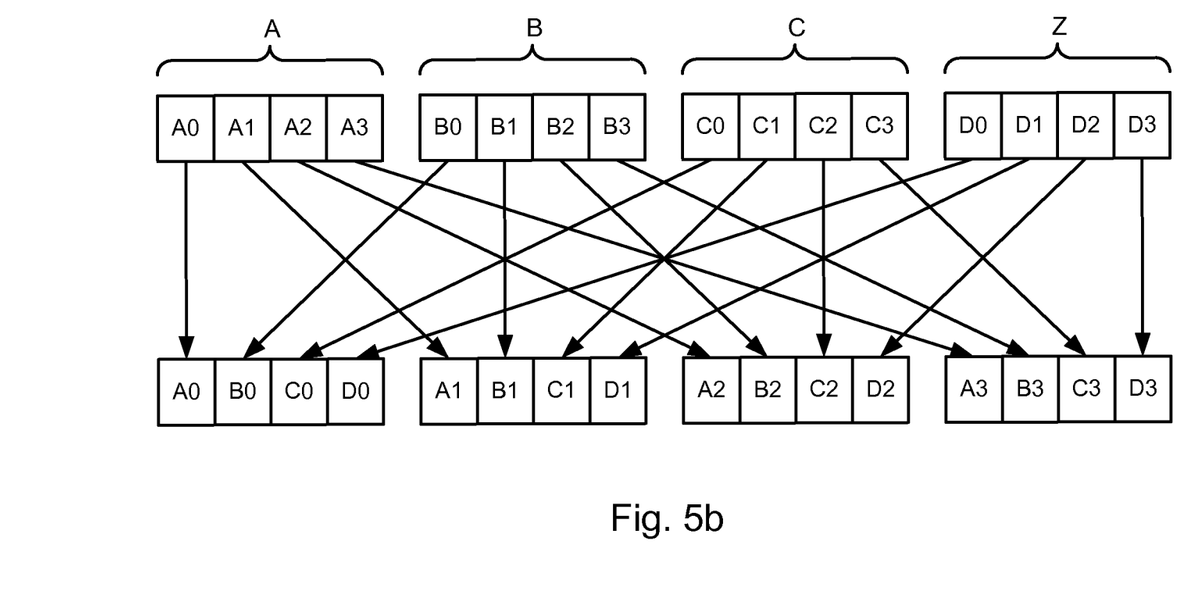

Encoded output 382 is provided to a scrambler circuit 330. Scrambler circuit 330 segregates encoded output into slices. For example, encoded output 382 may include a number of 4, KB encoded sectors which are each divided into 1, KB slices. Scrambler circuit 330 then rearranges the slices such that portions of the encoded sectors are intermixed. Turning to FIGS. 5a-5b, an example of data scrambling is shown. Turning first to FIG. 5a, an example of encoded output 382 is shown as a sliced data set 500. Sliced data set 500 includes four encoded sectors (i.e., A, B, C, D) and each of the four encoded sectors are segregated into four slices (i.e., encoded sector A segregated into slices A0, A1, A2, A3; encoded sector B segregated into slices B0, B1, B2, B3; encoded sector C segregated into slices C0, C1, C2, C3; and encoded sector D segregated into slices D0, D1, D2, D3). As shown in FIG. 5b, the slices of the encoded sectors A, B, C, D are re-arranged as shown such that A0, B0, C0, D0 are consecutively located followed by the other re-arranged encoded sectors. After scrambling the encoded output 382 similar to that discussed in relation to the example of FIG. 5, scrambler circuit 330 provides the result as a scrambled output 332 to a data splitting circuit 350.

Figure 4C:
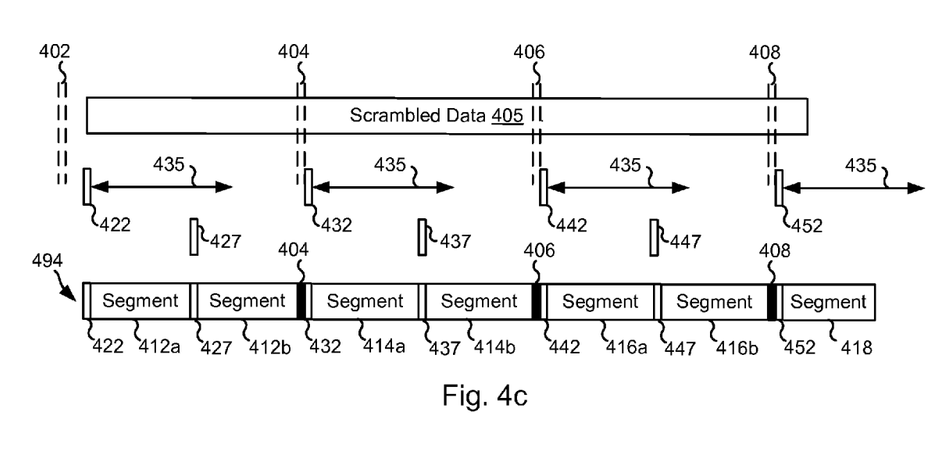
FIG. 4c, shows a data set to be stored to the storage medium of FIG. 4a, along with various dynamic formatting aligned with the various servo data wedges of FIG. 4a, in accordance with one or more embodiments of the present invention.

Turning to FIG. 4c, an example of scrambled data 405 is shown in relation to where it will be stored relative to servo data wedges 402, 404, 406, 408. A number of sets of dynamically inserted formatting information 427, 432, 437, 442, 447, 452 are shown in relation to interleaved data 405 and servo data wedges 402, 404, 406, 408 at locations where the respective inserted formatting information 427, 432, 437, 442, 447, 452 is to be written. Initial formatting information 422 is written directly preceding the beginning of interleaved data 405. As shown, inserted formatting information 432, 442, 452 are stored to disk platter 400 after respective data wedges 404, 406, 408. In addition, for regions between servo address marks that exceed maximum length 435, inserted formatting information 427, 437, 447 is inserted at a location that will assure that the maximum length between inserted formatting information 422, 427, 432, 437, 442, 447, 452 does not exceed maximum length 435. A data set 494 shows interleaved data 405 augmented with inserted formatting information 422, 427, 432, 437, 442, 447, 452 and interrupted by servo data wedges 404, 406, 408. As shown, user data region 412 is broken into two segments 412a, 412b, by inserted formatting information 427; user data region 414 is broken into two segments 414a, 414b, by inserted formatting information 437; and user data region 416 is broken into two segments 416a, 416b, by inserted formatting information 447.

Referring again to FIG. 3, the locations of inserted formatting information 427, 432, 437, 442, 447, 452 (discussed in relation to the example of FIGS. 4a-4c) is provided to dynamic format insertion circuit 310 as format location output 322. Format location output 322 is used by dynamic format insertion circuit 310 to cause a formatting interrupt 318 to assert at a location indicated by format location output 322. As more fully discussed below, formatting interrupt 318 operates to cause a data splitting circuit 350 to insert formatting information.

Data splitting circuit 350 receives formatting interrupt 318 and inserts formatting information into scrambled output 332 to yield a dynamically modified output 352. Again, as noted above, the formatting information may be a synchronization mark or include a sync mark.

As an example, dynamically modified output 352 may be similar to data set 494 discussed in relation to FIG. 4c, above. Dynamically modified output 352 is provided to a write pre-compensation and data transfer circuit 360. Write pre-compensation circuit generates a compensated output, and the data transfer circuit provides the compensated data as a data output 362 to medium 370. The write pre-compensation and data transfer circuitry may use any approach for write pre-compensation and data transfer known in the art.

Data output 362 is received by an analog front end circuit 315 from medium 370 as a read input 372. Analog front end circuit 315 processes read input 372 to yield a processed analog signal 317 that is provided to an analog to digital converter circuit 325. Analog front end circuit 315 may include, but is not limited to, an analog filter and an amplifier circuit as are known in the art. Based upon the disclosure provided herein, one of ordinary skill in the art will recognize a variety of circuitry that may be included as part of analog front end circuit 315. Analog to digital converter circuit 325 converts processed analog signal 317 into a corresponding series of digital samples 327. Analog to digital converter circuit 325 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 327 are provided to an equalizer circuit 335. Equalizer circuit 335 applies an equalization algorithm to digital samples 327 to yield an equalized output 337. In some embodiments of the present invention, equalizer circuit 335 is a digital finite impulse response filter circuit Equalized output 337 is provided to a sync detection and sync forcing circuit 398, and to a data buffer 348. In some embodiments of the present invention, a sync mark is a known data pattern used to identify locations in a data set. A sync mark is expected within a defined window around the location where formatting information was inserted during a data write or transmit operation (i.e., by data splitting circuit 350). An approximated location of the formatting information can be derived based upon knowledge of a maximum run between sync marks (for both data received from a transmitter and from a disk platter of a hard disk drive) and/or the location of servo data wedges (where the data is received from a disk platter of a hard disk drive). A window during which a sync mark is expected is used to limit the possibility of finding a sync mark in the user data. Where a sync mark is not expected (i.e., not within the window), sync detection and sync forcing circuit 398 will not assert a sync found signal 399. On the other hand, when a sync mark is expected, sync detection and sync forcing circuit 398 compares a known sync pattern with equalized output 337. Where a match is found, sync detection and sync forcing circuit 398 asserts sync found signal 399 indicating an actual sync mark was found. When a sync mark is expected but not found, sync detection and sync forcing circuit 398 asserts sync found signal 399 at a location corresponding to where the sync mark was expected, and the segment currently being processed is indicated as having a missing sync mark.

Data buffer 348 aligns equalized output 337 using asserted sync marks 399 (both actual and forced) resulting in essentially the scrambled data set (i.e., scrambled output 332) that was originally generated. This aligned scrambled data set is provided as a detector input 349 to data detecting circuit 355. Data detecting circuit 355 applies a data detection algorithm to the assembled segments to yield a detected output 357. The data detection algorithm may be, but is not limited to, a Viterbi data detection algorithm or a maximum a posteriori data detection algorithm as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detection algorithms that may be used in relation to different embodiments of the present invention. The resulting detected output may include both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention. Detected output 357 is provided to a de-scrambling circuit 351 that reverses the scrambling applied by scrambler circuit 330, and provides the resulting descrambled output as sector inputs 354.

Sector inputs 354 are provided to a data decoding circuit 365 that applies a data decoding algorithm to yield a decoded output. Data decoding circuit 365 includes missed format reversal circuitry. The data decoding algorithm operates to reverse the encoding applied prior to the data transfer. Thus, for example, where the data encoding was low density parity check encoding, the data decoding is a low density parity check decoding algorithm as is known in the art. Based upon the disclosure provided herein, one of ordinary skill in the art will recognize a variety of data encoding and decoding algorithms that may be used in relation to different embodiments of the present invention. It is determined whether application of the data decoding algorithm converged for all of the sectors. Where the algorithm converged (no errors remain), a decoded output 367 for the corresponding converged sectors is provided to a hard decision output circuit 375 that converts decoded output 367 to a user read output 377.

Alternatively, where application of the data decoding algorithm fails to converge, data decoding circuit 365 provides the resulting decoded output 356 to a re-scrambling circuit 353. Re-scrambling circuit 353 scrambles decoded output 356 so that it is re-aligned with a detector input 349. At this point the data detection algorithm and data decoding algorithm are re-applied using guidance from the previous decoded output 356. This process is repeated either until the resulting decoded output converges, or until a maximum number of iterations through data detecting circuit 355 and data decoding circuit 365 have completed.

Where the maximum number of iterations have completed without reaching convergence, data decoding circuit 365 re-applies the data decoding while setting soft data associated with slices or segments where a sync mark was forced (i.e., the segments indicated by sync detection and forcing circuit 398) to zero. By setting them to zero, the likelihood that those elements are correct is set to zero. In addition, data decoding circuit 365 selects a slice from the decoded output corresponding to the missed sync mark is identified as a SyncTrue output 388 that is provided to a reverse sync mark derivation circuit 385.

Reverse sync mark derivation circuit 385 selects a slice from equalized output 337 that corresponds to SyncTrue output 388. The selected slice is designated as a SyncOriginal output 338. Reverse sync mark derivation circuit 385 auto-correlates SyncOriginal output 338 with itself to yield an original forced sync location (LAGN), and correlates SyncOriginal output 338 with SyncTrue output 388 to yield an actual sync location (LMIS). Reverse sync mark derivation circuit 385 subtracts LAGN from LMIS to yield a difference indicating a needed shift between the original force sync and a newly forced sync.

Reverse sync mark derivation circuit 385 replaces the originally forced sync mark with an updated forced sync mark 386. Data buffer 348 r-aligns the previously stored equalized output 337 using updated forced sync mark 386. This aligned scrambled data set is provided as detector input 349 to data detecting circuit 355. The process of applying the data detection algorithm by data detecting circuit 355 and the data decoding algorithm by data decoding circuit 365 is repeated for the newly aligned data. During an initial pass through the iterations, erasure decoding is applied to the slice associated with the forced. If such decoding results in convergence of the data, the process ends and the converged data is provided as user read data 387. Where, on the other hand, the processing fails, the data processing is repeated without erasing the data corresponding to the slice.

Figure 6:
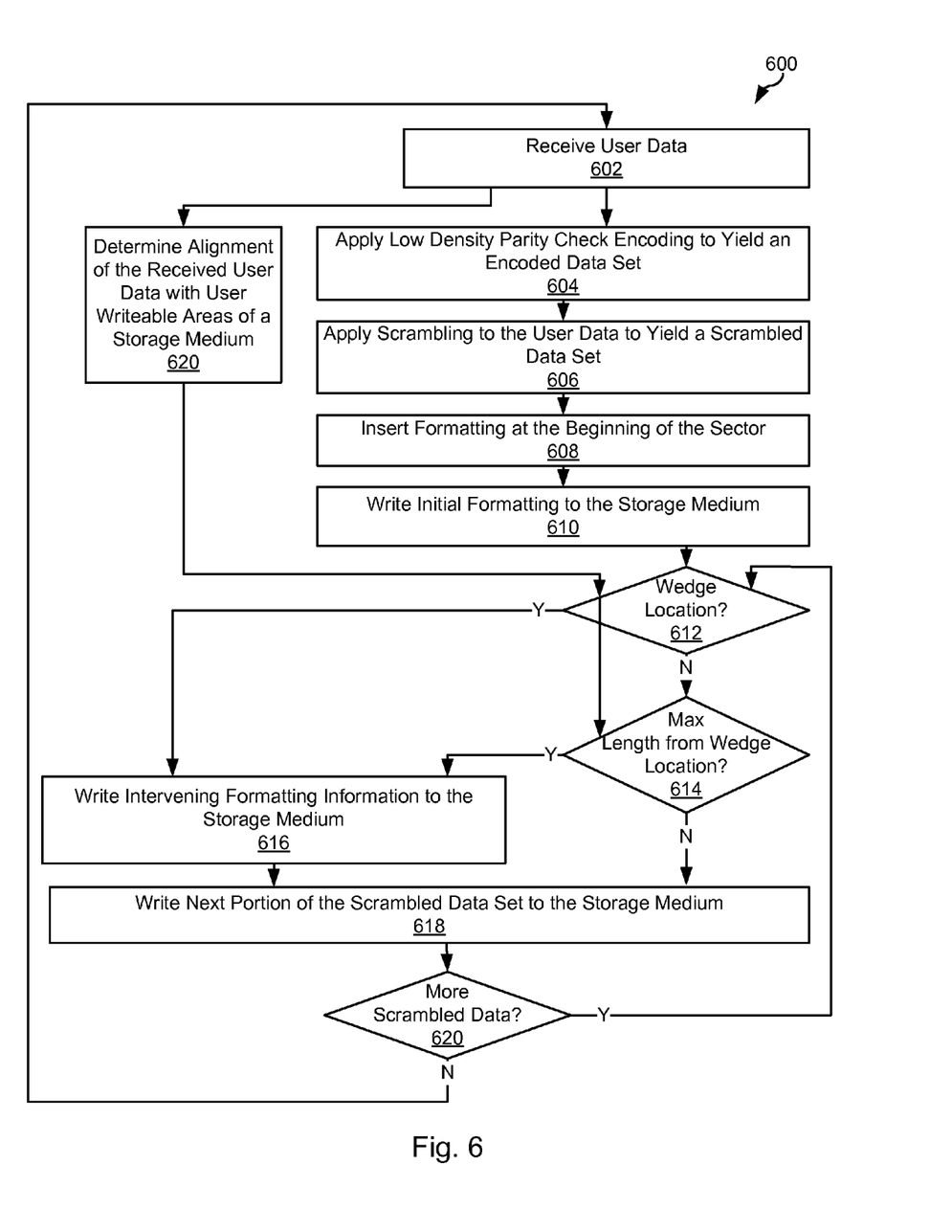
FIG. 6 is a flow diagram showing a method in accordance with some embodiments of the present invention for dynamic format insertion during a data transfer process.

Turning to FIG. 6, a flow diagram 600 shows a method in accordance with some embodiments of the present invention for dynamic format insertion during a data transfer process. Following flow diagram 600, user data is received (block 602). This user data may be any data intended to be transferred, for example, via a storage medium or other transfer medium. In some cases, this user data is received from a host device. The received user data is encoded to yield an encoded data set (block 604). In some embodiments of the present invention, the data decoding algorithm is a low density parity check encoding algorithm. A scrambling algorithm is applied to the encoded data set to yield a scrambled data set (block 606). The scrambling may be done, for example, similar to that discussed above in relation to FIGS. 5a-5b. Formatting information including a sync mark is inserted at the beginning of the scrambled data set (block 608), and the initial formatting and first portion of the data set is stored to a storage medium (block 610).

In parallel, an expected alignment of the received used data with user writable areas on the storage medium is determined (block 620). This alignment predicts where the scrambled data set will be stored in relation to servo data wedges (where storage to a disk platter is intended) and/or expected lengths between intervening user data. This alignment information becomes a guide to where formatting is to be dynamically inserted. Based upon the determined locations (block 620), it is determined whether the next portion of the data is to be written directly after a servo data wedge on the storage medium (block 612). Where the next portion of he data is to be written directly after a servo data wedge on the storage medium (block 612), intervening formatting information including a sync mark is stored to the storage medium prior to storing an additional portion of the scrambled data (block 616).

Alternatively, where the next portion of the data is not to be written directly after a servo data wedge on the storage medium (block 612), it is determined whether the maximum length from a servo data wedge has passed (block 614). It should be noted that in some cases it may be a maximum length from the location of the last intervening formatting information. Where the maximum length from the servo data wedge has been exceeded (block 614), intervening formatting information including a sync mark is stored to the storage medium prior to storing an additional portion of the scrambled data (block 616). Where either a servo data wedge location (block 612) or a maximum length (block 614) are not found or intervening formatting information has been stored to the storage medium (block 616), the next portion of the scrambled data set is stored to the storage medium (block 618). It is then determined whether more scrambled data remains to be stored to the storage medium (block 620). Where more scrambled data remains to be stored (block 620), the processes of blocks 612-618 are performed for the additional data. Otherwise, where all of the scrambled data set has been stored to the storage medium (block 620), the process returns to block 602.

Figure 7:
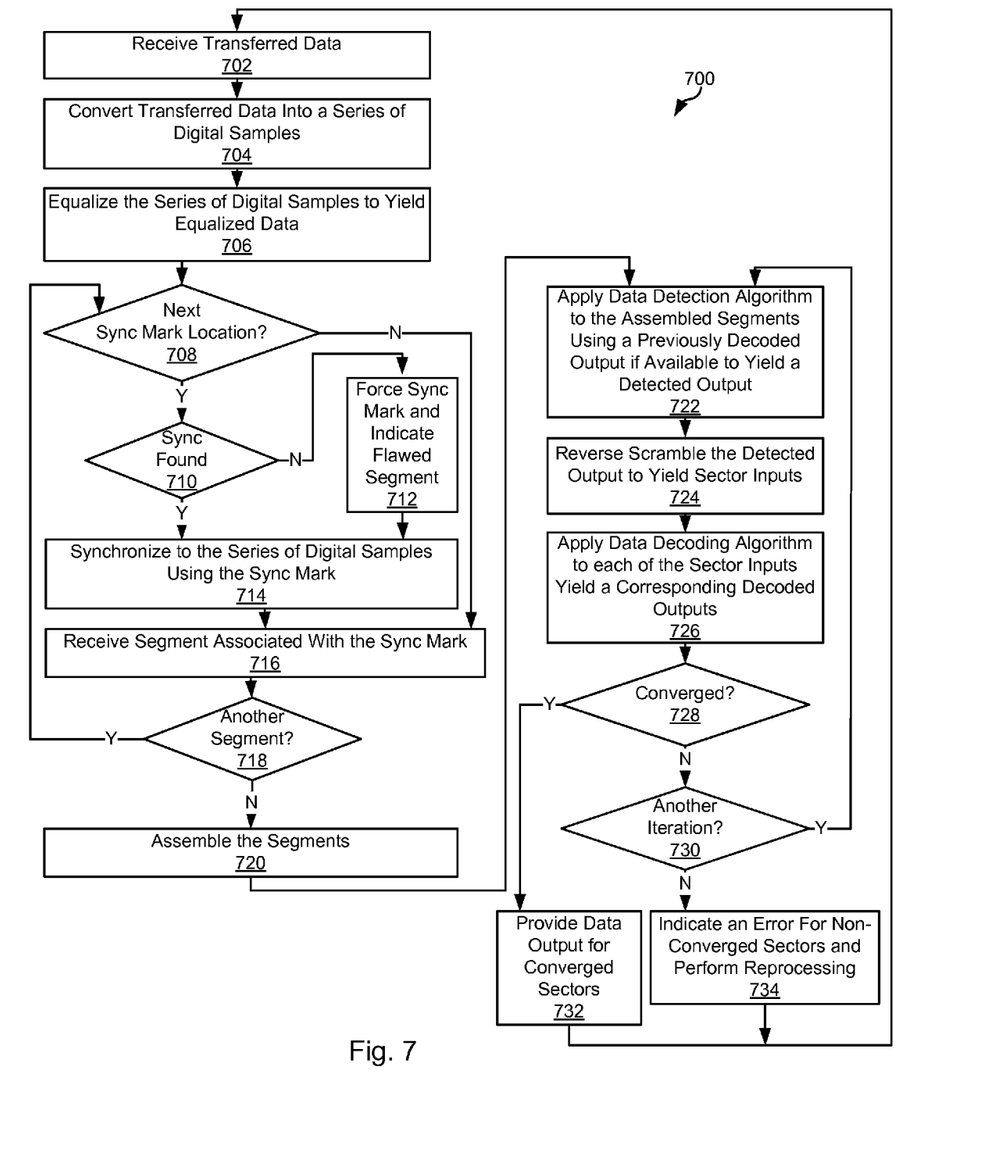
FIGS. 7-8 are flow diagrams showing a method for large sector data recovery using multiple formatting inserted during a data transfer in accordance with various embodiments of the present invention.

Turning to FIG. 7, a flow diagram 700 shows a method for recovering data using multiple formatting inserted during a data transfer in accordance with various embodiments of the present invention. Following flow diagram 700, transferred data is received (block 702). This may include, for example, receiving data accessed from a storage medium or receiving data via a wireless data transfer medium. Based upon the disclosure provided herein, one of ordinary skill in the art will recognize a variety of mechanisms for receiving transferred data and/or sources from which the transferred data may be received. Where the transferred data is received as an analog signal, the analog signal is converted into a series of digital samples (block 704). This may be done, for example, by using an analog to digital converter circuit as are known in the art.

The series of digital samples are equalized to yield an equalized output (block 706). The equalization may be performed, for example, by a digital finite impulse response filter circuit as are known in the art. It is determined whether a sync mark is expected (block 708). A sync mark is expected within a defined window around the location where formatting information was inserted during a data write or transmit operation. An approximated location of the formatting information can be derived based upon knowledge of a maximum run between sync marks (for both data received from a transmitter and from a disk platter of a hard disk drive) and/or the location of servo data wedges (where the data is received from a disk platter of a hard disk drive). A window during which a sync mark is expected is used to limit the possibility of finding a sync mark in the user data. Where a sync mark is not expected (block 708), finding a sync mark and/or forcing a sync mark is disabled.

Where a sync mark is expected (i.e., the currently processing equalized data is within a window of an expected sync mark)(block 708), it is determined whether a sync mark is found within the defined window (block 710). Finding a sync mark may be done, for example, by comparing a sync mark pattern with a series of the received equalized data. Based upon the disclosure provided herein, one of ordinary skill in the art will recognize a variety of ways in which a sync mark may be detected in the equalized data. A sync mark may be missed or lost due to a number of factors including, but not limited to, noise in the data introduced during data transfer. Where a sync mark is not found within the expected window (block 710), a sync mark is forced at a location where the sync mark was expected, and a potentially flawed segment is identified (block 712). This forced sync mark identifies a best guess at the location of the start of the next segment to be processed. This location would have been identified by an actual sync mark if it had not been missed. The best guess for the location of the forced sync mark may be accurate or may be incorrect. Where the forced sync mark is placed at the correct location, the data processing will likely be able to recover the data corresponding to the segment near the missed sync mark. Where the sync mark is not placed at the correct location, additionally processes may be employed to recover the data (see FIG. 8).

Where either the sync mark was found (block 710) or the sync mark was forced (block 712), the sync mark is used to synchronize the data processing to the location of an expected segment (block 714). The equalized data associated with the segment corresponding to the sync mark is received and stored (block 716). It is determined whether the transferred data includes more segments (block 718). This may be determined, for example, based upon an expected number of segments per data set. Where another segment is expected (block 718), the processing of blocks 708-716 is repeated for the next segment.

Otherwise, where all of the segments have been received (block 718), the segments are re-assembled to yield the originally transmitted data set in preparation for back end processing (block 720). A data detection algorithm is applied to the assembled segments to yield a detected output (block 722). Where an earlier application of a data decoding algorithm has been applied, the decoded output resulting from the earlier application of the data decoding algorithm is used to guide the data detection. The data detection algorithm may be, but is not limited to, a Viterbi data detection algorithm or a maximum a posteriori data detection algorithm as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detection algorithms that may be used in relation to different embodiments of the present invention. The resulting detected output may include both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

A reverse scramble is performed on the detected output to yield originally encoded sector inputs (block 724). This reverse scramble operates to reverse the data scrambling process applied prior to the data transfer. Thus, as an example, the reverse scramble reverses the process discussed above in relation to FIGS. 5a-5b. A data decoding algorithm is then applied to the re-constituted sector inputs to yield corresponding decoded outputs (block 726). The data decoding algorithm operates to reverse the encoding applied prior to the data transfer. Thus, for example, where the data encoding was low density parity check encoding, the data decoding is a low density parity check decoding algorithm as is known in the art. Based upon the disclosure provided herein, one of ordinary skill in the art will recognize a variety of data encoding and decoding algorithms that may be used in relation to different embodiments of the present invention.

It is determined whether application of the data decoding algorithm converged (block 728). Where the algorithm converged (no errors remain) (block 728), the decoded output for the corresponding converged sector is provided (block 732). Otherwise, where the algorithm failed to converge (errors remain) (block 728), it is determined whether another iteration applying the data detection algorithm and the data decoding algorithm is desired (block 730). A number of iterations applying the data detection algorithm and data decoding algorithm may be applied depending upon a particular design and throughput constraints. Where another iteration is desired (block 730), the processes of blocks 722-730 are repeated. Alternatively, where no additional iterations are desired (block 730), an error is indicated for the corresponding non-converged sectors is indicated and reprocessing (discussed in relation to FIG. 8) is performed (block 734). The process of applying the data detection algorithm and data decoding algorithm is applied to all sector inputs until convergence or non-convergence is determined for each of the inputs.

Figure 8:
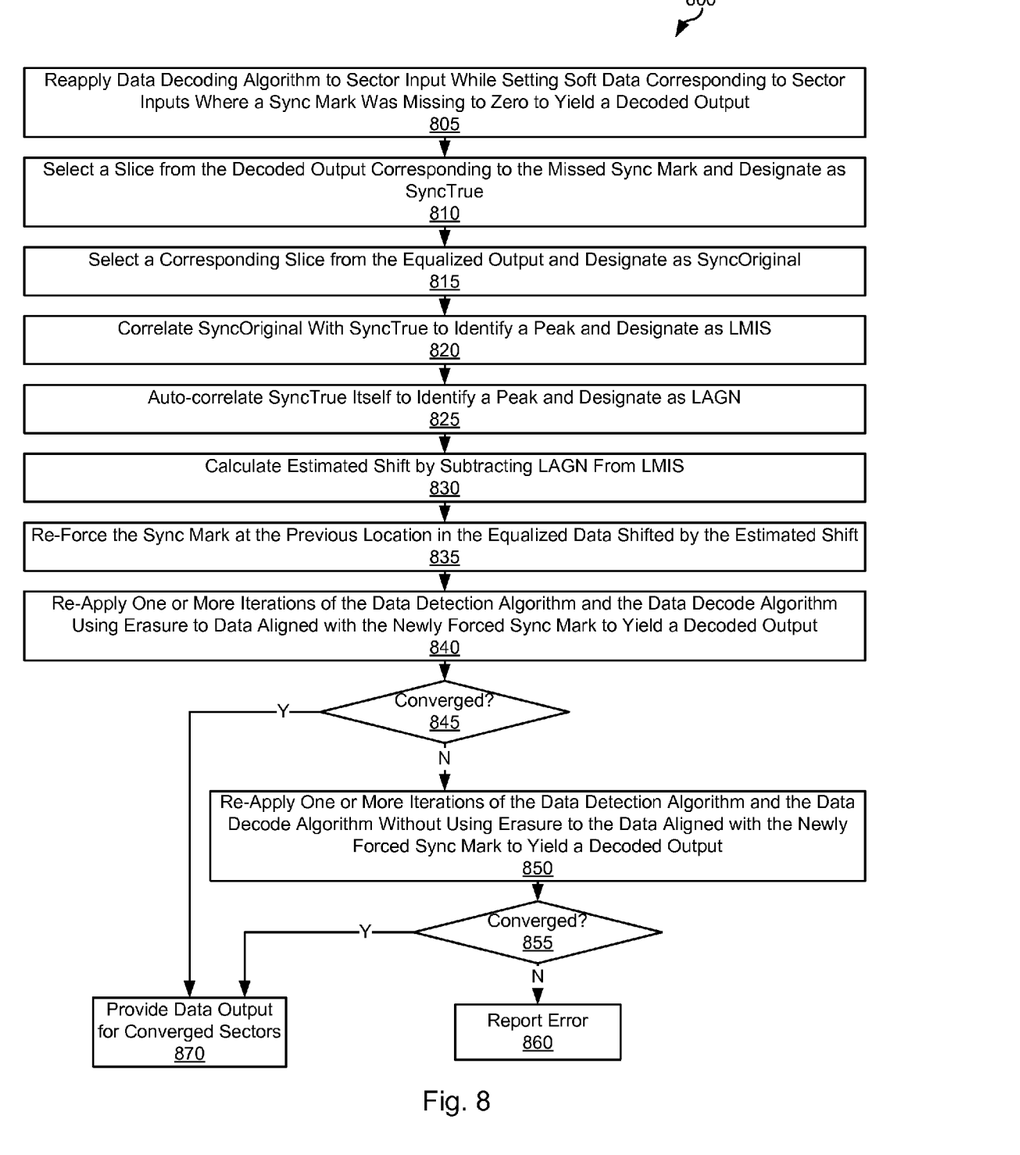
Figure 9A:
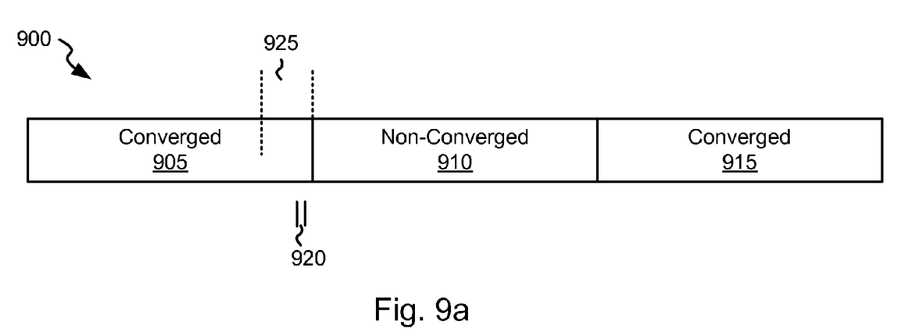
FIGS. 9a-9b, show example data from a reprocessing condition in accordance with one or more embodiments of the present invention.

Turning to FIG. 8, a flow diagram 800 shows a method for reprocessing non-converged data originally processed using using multiple formatting inserted during a data transfer in accordance with various embodiments of the present invention. Following flow diagram 800, the data decoding algorithm is re-applied to each sector input that surrounds a missed sync mark and was thus originally processed using a forced sync mark while erasing all of the elements (e.g., setting the soft data to a low likelihood value) corresponding to the slice of the sector input corresponding to the forced sync mark (block 805). The slice of the resulting decoded output corresponding to the forced sync mark is identified as SyncTrue (block 810). An example of this is shown in FIG. 9a, where a converged data set 905 having a slice 925 that surrounded a missing sync mark 920. In this case, slice 925 is identified as SyncTrue. The corresponding slice from the equalized output (i.e., the data prior to application of the data detection algorithm and the data decoding algorithm) is identified as SyncOriginal (block 815).

Figure 9B:
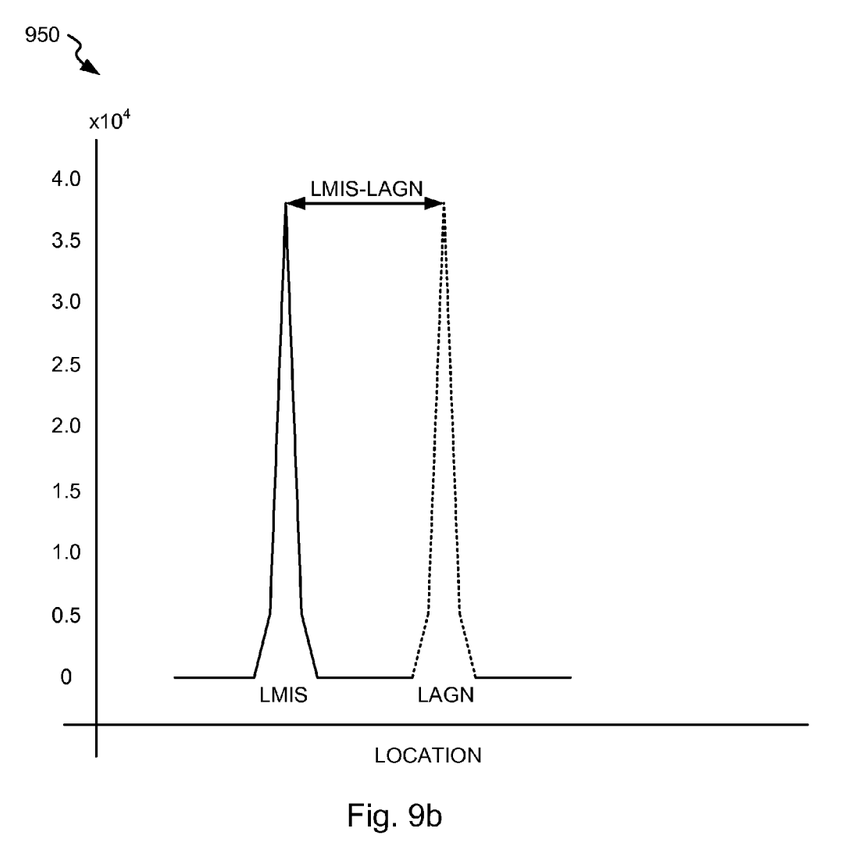

SyncOriginal is correlated with SyncTrue to identify a peak correlation (i.e., a location where the two are most closely correlated) between the two data sets (block 820). The peak of the correlation is identified as LMIS. This establishes where in the equalized data the sync mark should have been forced. An example of this correlation is shown in FIG. 9b, where LMIS is identified as a function of location. SyncOriginal is auto-correlated to identify a peak which is designated as LAGN (block 825). This establishes where the original sync was forced. A difference between LMIS and LAGN is calculated (block 830). This difference corresponds to a needed shift between the original force sync and a newly forced sync.

The sync is then re-forced at the shifted location (block 835), and one or more iterations of the data detection algorithm and the data decoding algorithm are applied to the equalized output corresponding to the sector inputs defined based upon the newly forced sync mark with the slice corresponding to the sync mark erased (e.g., setting the soft data to a low likelihood value) (block 840). This process is applied to the sector inputs that failed to converge and yields a decoded output. It is determined whether the various sector inputs converged (block 845). Where the sector inputs did converge (block 845), data for the converged outputs is provided (block 870). Otherwise, where one or more sector inputs failed to converge (block 845), one or more iterations of the data detection algorithm and the data decoding algorithm are applied to the equalized output corresponding to the sector inputs defined based upon the newly forced sync mark using the data in the slice corresponding to the sync mark erased (i.e., non-erasure decoding) (block 850). It is determined whether the various sector inputs converged (block 855). Where the sector inputs did converge (block 855), data for the converged outputs is provided (block 870). Otherwise, where one or more sector inputs failed to converge (block 855), an error is indicated (block 860).

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the system comprising:
a sync mark detection and forcing circuit operable to:
query an input data set to identify an actual sync mark; and
force a proxy sync mark at a first location where the actual sync mark is not identified; and
re-force the proxy sync mark based upon an offset;
a data processing circuit operable to:
apply a data processing algorithm to the input data set aligned using the forced proxy sync mark to yield a processed output; and
re-apply the data processing algorithm to the input data set aligned using the re-forced proxy sync mark to yield a re-processed output; and
a reverse sync mark derivation circuit operable to:
correlate a portion of the processed output with a corresponding portion of the input data set to yield a true sync location; and
calculate a difference between the true sync location and the first location to yield the offset.

2. The data processing system of claim 1, wherein the reverse sync mark derivation circuit is further operable to:
auto-correlate the corresponding portion of the input data set to yield an original sync location; and
wherein calculating the difference between the true sync location and the location of the forced sync mark includes calculating a difference between the true sync location and the original sync location.

3. The data processing system of claim 1, wherein the data processing circuit includes a data decoding circuit operable to apply a data decoding algorithm to a decoder input derived from the input data set to yield the processed output.

4. The data processing system of claim 3, wherein the data decoding algorithm is a low density parity check algorithm.

5. The data processing system of claim 3, wherein the data processing circuit further includes a data detecting circuit operable to apply a data detection algorithm to a detector input derived from the input data to yield a detected output, and wherein the decoder input is derived from the detected output.

6. The data processing system of claim 5, wherein the data processing circuit further includes a de-scrambling circuit operable to de-scramble the detected output to yield the decoder input.

7. The data processing system of claim 1, wherein querying the input data set to identify an actual sync mark includes comparing the input data set with a known sync pattern.

8. The data processing system of claim 1, wherein the sync mark detection and forcing circuit is operable to re-force the proxy sync mark based upon the offset when the processed output includes errors.

9. The data processing system of claim 1, wherein the sync mark detection and forcing circuit is operable to query the input data set to identify the actual sync mark during a period when formatting information including the actual sync mark is expected.

10. The data processing system of claim 1, wherein the data processing system is implemented as part of a device selected from a group consisting of:
a storage device, and a communication device.

11. The data processing system of claim 1, wherein the actual sync mark is a known pattern.

12. The data processing system of claim 1, wherein the data processing system is implemented as part of an integrated circuit.

13. A method for data transfer, the method comprising:
receiving an input data set;
querying the input data set for an actual sync mark;
forcing a proxy sync mark where the actual sync mark is not found in the input data set;
applying a data processing algorithm using a data processing circuit to the input data set to yield a processed output;
correlating a portion of the processed output with a corresponding portion of the input data set to yield a true sync location;
calculating a difference between the true sync location and the location of the forced sync mark to yield an offset;
re-forcing the proxy sync mark based upon the offset; and
re-applying the data processing algorithm using the data processing circuit to the input data set aligned using the re-forced proxy sync mark to yield a re-processed output.

14. The method of claim 13, wherein the method further comprises:
auto-correlating the corresponding portion of the input data set to yield an original sync location; and
wherein calculating the difference between the true sync location and the location of the forced sync mark includes calculating a difference between the true sync location and the original sync location.

15. The method of claim 13, wherein the data processing circuit includes a data decoding circuit operable to apply a data decoding algorithm to a decoder input derived from the input data set to yield the processed output.

16. The method of claim 15, wherein the data decoding algorithm is a low density parity check algorithm.

17. The method of claim 15, wherein the data processing circuit further includes a data detecting circuit operable to apply a data detection algorithm to a detector input derived from the input data to yield a detected output, and wherein the decoder input is derived from the detected output.

18. The method of claim 17, wherein the data processing circuit further includes a de-scrambling circuit operable to de-scramble the detected output to yield the decoder input.

19. The method of claim 13, wherein re-forcing the proxy sync mark based upon the offset is done when the processed output includes errors.

20. A data processing system, the system comprising:
a sync mark detection and forcing circuit operable to:
query an input data set to identify an actual sync mark; and
force a proxy sync mark at a first location where the actual sync mark is not identified; and
re-force the proxy sync mark based upon an offset;
a data processing circuit operable to:
apply a data processing algorithm to the input data set aligned using the forced proxy sync mark to yield a processed output; and
re-apply the data processing algorithm to the input data set aligned using the re-forced proxy sync mark to yield a re-processed output;
a reverse sync mark derivation circuit operable to generate a true sync location based in part on an output derived from the input data set, wherein the offset corresponds to a difference between the true sync location and the first location.

21. The data processing system of claim 20, wherein the reverse sync mark derivation circuit is operable to:
correlate a portion of the processed output with a corresponding portion of the input data set to yield the true sync location; and calculate a difference between the true sync location and the first location yield the offset.

22. The data processing system of claim 21, wherein generating the true sync location based in part on the output derived from the input data set by the reverse sync mark derivation circuit includes:
   auto-correlating the corresponding portion of the input data set to yield an original sync location, wherein calculating the difference between the true sync location and the first location includes calculating a difference between the true sync location and the original sync location.

* * * * *